Jan. 14, 1930.  G. M. PARKER  1,743,830
RECUPERATOR
Filed Oct. 24, 1927  2 Sheets-Sheet 1
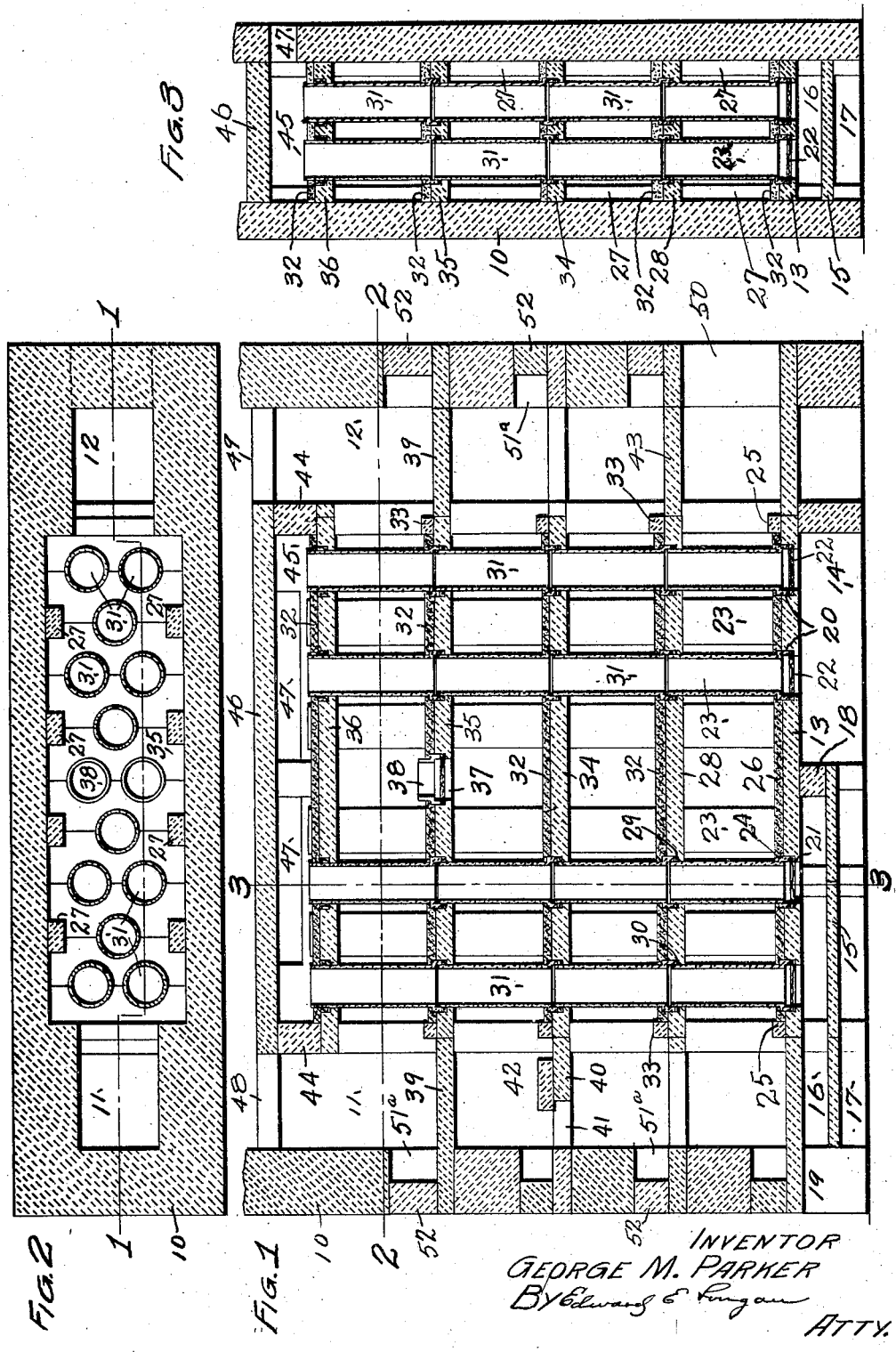
INVENTOR
GEORGE M. PARKER
BY Edward E. Longan
ATTY.

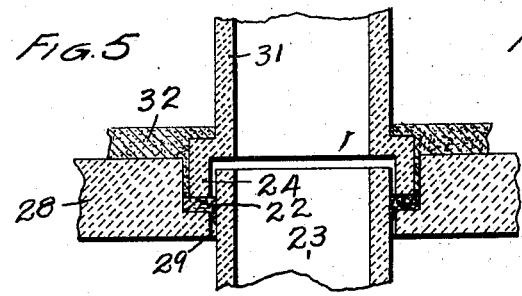
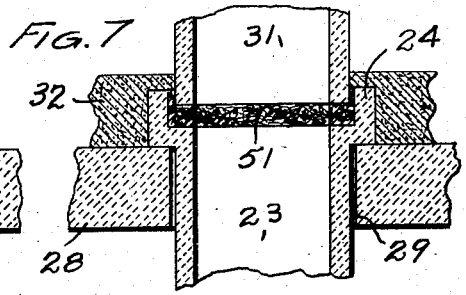
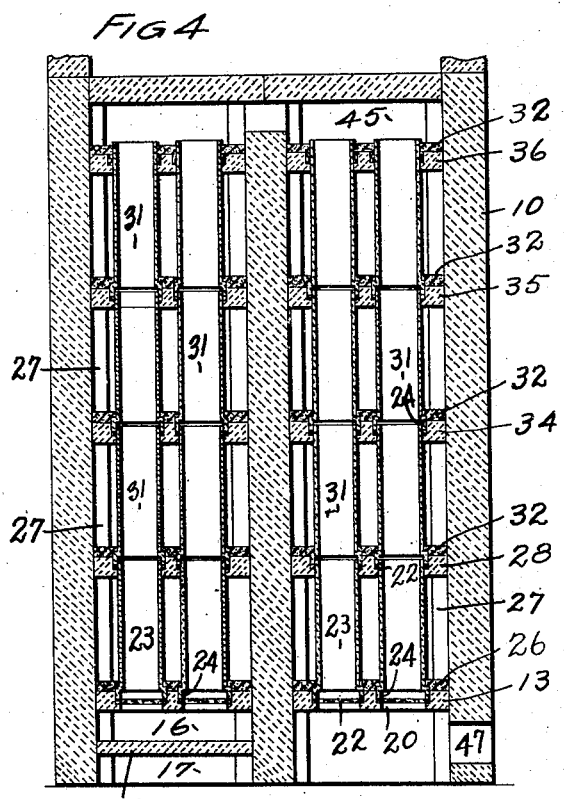
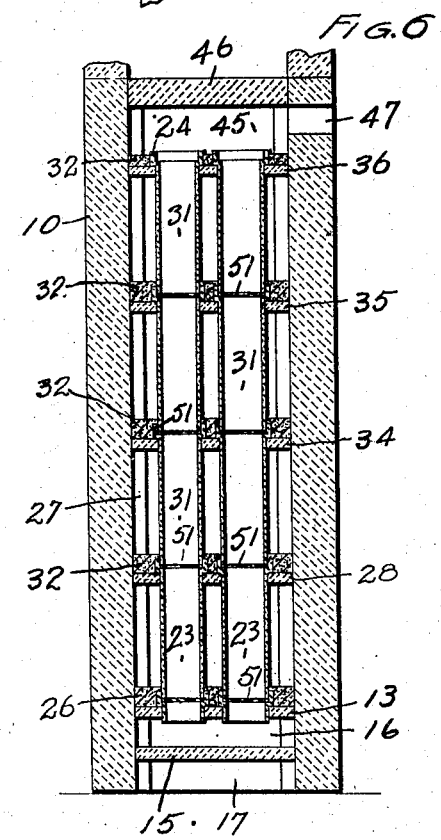
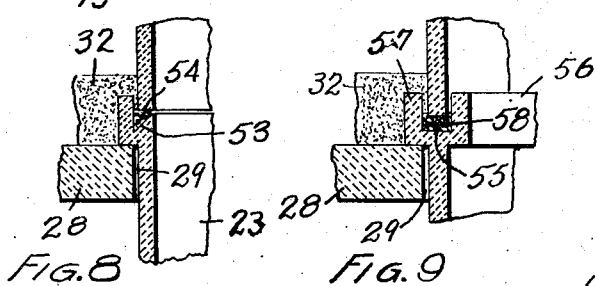
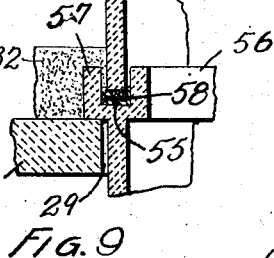

Patented Jan. 14, 1930

1,743,830

UNITED STATES PATENT OFFICE

GEORGE M. PARKER, OF ST. LOUIS, MISSOURI

RECUPERATOR

Application filed October 24, 1927. Serial No. 228,172.

My invention relates to improvements in recuperators, and has for its primary object a recuperator in which the air ducts extend vertically and are built of hollow tile, fitting loosely within each other and each duct being separately supported so that the various ducts can expand independently of each other thereby eliminating the danger of cracking.

A further object is to construct a recuperator in which vertical hollow tiles are used and in which the supporting tiles for the hollow tiles form passageways for the hot gases.

A still further object is to construct a recuperator composed of air ducts or hollow tiles having their ends fitting within each other and having joints between vertically adjacent ducts or tiles so packed as to permit free expansion of the duct or tile but at the same time any leakage of hot gases into the hollow tiles or air ducts is prevented.

My recuperator is designed for any kind of furnace in which highly heated air is to be delivered to the furnace and in which hot gases from the furnace are employed to heat such air. It will be noted that by my construction and by reason that each tier of hollow tiles, of which the air ducts are formed, is independently supported so that the ducts can be made much thinner than where the entire or at least lower portion of the duct must support the entire weight of the air duct. This permits the air passing through the air duct to become heated much more readily than where thick walls are used, and consequently I am enabled to construct my recuperator of a much smaller size and still obtain the same efficiency.

In the drawings:

Fig. 1 is a longitudinal section of a recuperator taken on the line 1—1 of Fig. 2;

Fig. 2 is a horizontal section taken on the line 2—2 of Fig. 1;

Fig. 3 is a vertical section taken on the line 3—3 of Fig. 1;
Fig. 4 is a sectional view similar to Fig. 3 but showing a double construction of recuperator;

Fig. 5 is an enlarged fragmental section of one of the supporting tiles showing the manner in which the air ducts are supported thereby and the manner of packing the same so as to prevent leakage;

Fig. 6 is a vertical section similar to Fig. 3 showing a modified form of supporting the tiles;
Fig. 7 is an enlarged fragmental view illustrating the manner in which the tiles are supported and packed against leakage;

Fig. 8 is a fragmental view illustrating a different form of bell on the air ducts and the manner in which the ducts are assembled; and Fig. 9 is a view similar to Fig. 8 illustrating the form of bell.

In the construction of my device I build a housing 10. This housing is formed of refractory material so that it will resist heat. Adjacent each end of the housing are passages 11 and 12, which serve as passageways for the hot gases coming from the furnace. Above a lower edge of the housing 10 is a floor or baffle 13 forming an air passage 14. The forward portion of the air passage is divided by means of tiles 15 so as to form air passages 16 and 17. The air passage 16 is closed at its rear end by means of a wall 18 while the air passage 17 communicates at its rear end with the air passage 14. The air passages 16 and 17 communicate with an opening 19 formed in one wall of the housing 10. The tiles which compose the floor or baffle 13 are provided with a plurality of openings 20. These openings are provided with a shoulder 21 and on the shoulder 21 is placed a gasket or quantity of fibrous heat resisting material 22. After this has been placed in position air ducts 23 are placed in position with the bells 24 thereof entering the openings 20. These bells have their edges resting on the gasket 22.

After the row of tiles or air ducts 23 has been placed in position I next place blocks 25 on the tiles adjacent the passages 11 and 12. Then on top of the floor 13 is placed a layer or packing of fine granular material 26. This granular material is either sand or carborundum or similar material, which will not fuse readily, or in fact which will not fuse at all under the heat to which it is to be subjected. Prior to placing the granular packing material 26 on the floor 13 I place a plurality of vertically extending blocks or piers 27 against the inside walls of the housing 10. These blocks support on their upper ends tiles 28 which form a second floor or baffle and which are provided with openings 29 similar to the openings 20. These tiles 28 receive the upper ends of the air ducts 23, and surrounding the upper ends of the ducts 33 is a gasket 30, which is of the same material as the gasket 22. The ducts 31 are then placed in position in the same manner as the ducts 23. Then the floor is completed by means of a layer 32 of granular packing material in the same manner as the layer 26. This layer is held in position by means of tiles or blocks 33.

The floors or baffles 34, 35 and 36 are built up in the same manner, with this exception: It will be noted from Fig. 1 that the floor 35 has openings 37 therethrough in which short tiles 38 are placed. These tiles act as passageways for the hot gases to pass from between the floors 35 and 36 downward into the passage between the floors 35 and 34. The floor 35 has its ends 39 extending entirely across the passages 11 and 12 so that any gases entering these passages must pass between the floors 35 and 36 and down through the tiles 38. It will be noted that the floor 34 has an extension 40 which extends only partially into the passage 11 so as to leave a passage 41. The size of this passage 41 is controlled by means of a sliding damper 42. The floor 28 has an extension 43 which closes the passage 12 so that any gases passing down through the passage 12 after having passed between the floors 34 and 35 must pass between the floors 28 and 34 and over to the passage 11. The paths of travel of these gases will be explained in detail later.

Supported by the floor 36 are tiles 44, which form the end walls for the air collecting chamber 45. This chamber is closed by means of a roof 46 and is provided with outlets 47. To these outlets it is my intention to attach conduits which will lead the heated air to the proper point.

The roof 46 is provided with openings 48 and 49, which lead respectively to the passages 11 and 12. These openings are connected in any suitable manner to the furnace or oven from which the hot gases are taken. One of the walls of the casing or housing 10 is provided with an opening 50 to which is connected a pipe, which leads to any suitable point, either a smoke stack or to a gas collector.

It will be noted from Fig. 2 that the ducts are so arranged that the gases passing from one passage to another will have to circulate around these ducts so that they will become thoroughly heated and readily conduct the heat absorbed by them to the air passing through the ducts. It will also be noted that the air in its passage through the ducts travels in a reverse direction to the heated gases.

In Figs. 6, 7, 8 and 9 I have shown a modified form of structure in which the bells of the air ducts rest on the upper surface of the supporting tiles and the fibrous packing material 51 is placed in the bell of the tile and the straight end of the tile immediately above enters the bell and rests on the packing. The packing in all events is of fibrous material and sufficiently resilient so that in the event of longitudinal expansion of the tiles, it will give and then when contraction occurs, will spring back. Its main purpose, however, is to prevent any of the granular material placed on the floors and over the bells from entering the air ducts. This granular packing material is fine enough and put on in a layer thick enough to prevent the heated gases from seeping through into the air ducts because if any amount of seepage occurs, there will be great danger of combustion occurring within the tiles and instead of delivering heated air to the furnace or oven, products of combustion will be delivered. This has also been a great drawback in recuperators where heavy tiles were used, which were rigidly secured together, because one portion of the tile might expand more than the other and cause it to crack, but with my construction by using short tiles for the air ducts supporting each one independently of the other and having what may be termed compensating joints between adjacent ends of these tiles, each tile composing the air duct can expand independently of the other tile so there will be less danger of causing it to either break itself or to break the other tile.

It will also be noted from Figs. 5, 7, 8 and 9 that the tiles or ducts are loosely supported by or suspended from the floors or baffles so that the floors or baffles and ducts or tiles can expand independently of each other without danger of either of them breaking.

The end walls of the housing 10 are provided with openings 51$^a$ which are closed by means of plugs or other closures 52 so that the openings 51$^a$ can be either tightly closed against leakage of gas or they can be opened for inspection purposes so that the condition of the tiles and air ducts can be ascertained. It will be noted from Fig. 8 that in the modified construction of bell the shoulder 53 is inclined upwardly and inwardly. In this way the packing or gasket 54 will be held in position more securely and there will be less possibility of any of this packing entering the air ducts. In Fig. 9 I have shown another modified form of bell in which the shoulder 55 is provided with flanges 56 and 57 forming virtually a double bell. The packing 58 is placed between the two flanges or in the channel formed by the flanges and the end of the adjacent tile or duct is also inserted between the two flanges. With this construction there is absolutely no possibility of the packing or fibrous material working its way into the air ducts.

It will also be understood that the granular material, in addition to being such that it will not fuse readily, is also non-combustible and its composition is such that in becoming heated through the action of the hot gases passing thereover it will not in any way combine with or effect the gases.

Another important feature of my device is that the granular material used for packing on the baffles is of such a nature that the granules will not become cohesive so as to form a solid mass or even become baked together under the heat to which they are subjected so that at all times the separate granules will be free to flow or move as expansion and contraction takes place and thus closely surround the ducts and so prevent any leakage of gases.

It is also a well known fact that the entire recuperator expands and contracts as the temperature of the fire or waste gases varies. This is termed in the trade "breathing" and if the ducts and floors or baffles are not movable independently of each other, as in my construction, undue stresses and strains will be set up, which might result in the fracture of one or more of the ducts. This breathing also brings out the utility of my granular packing as this can move or flow readily. The breathing, and also any independent movement of individual ducts or baffles caused by variations in expansion or contraction, will be prevented because the granular packing will have the same effect substantially as a liquid would, that is it will move or flow to compensate for any expansion or contraction.

It is also possible with my device that instead of using the ducts to supply heated air and the passage between the baffles for the passage of waste or furnace gases, the structure can be reversed and the waste or furnace gases passed through the ducts and the air to be heated passed between the baffles and around the ducts.

Having fully described my invention what I claim is:—

1. A recuperator comprising a casing, horizontally arranged baffles located in said casing, vertically aligned ducts having enlarged upper ends supported by said baffles and so arranged as to form vertical passages in said casing, and a layer of granular material located on each of said baffles and closely surrounding said ducts, said granular material preventing said hot gases from entering said ducts.

2. A recuperator comprising a casing, a plurality of horizontal baffles located in said casing, a plurality of ducts having bells supported at the bell end by said baffles and so arranged as to form vertical passages in said casing, and a layer of granular material located on each of said baffles and closely surrounding said ducts, said granular material preventing hot gases from entering said ducts.

3. A recuperator comprising a casing, parallel horizontally arranged baffles located in said casing and forming horizontal passages therein, vertically aligned ducts supported by said baffles, each duct having a bell on one end, said bell adapted to receive the opposite end of a duct in vertical alignment therewith, and a layer of granular material located on each of said baffles and closely surrounding said ducts, said granular material preventing furnace gases from entering said ducts.

4. A recuperator comprising a casing, parallel horizontally arranged baffles located in said casing, vertically aligned ducts having a bell on one end carried by said baffles, said bell adapted to receive the opposite end of a duct in vertical alignment therewith, fibrous resilient packing between adjacent ends of the vertically aligned ducts, and a layer of granular material located on each of said baffles and closely surrounding said ducts, said granular material preventing furnace gases from entering said ducts.

5. A recuperator comprising a casing, baffles located in said casing, vertically aligned ducts supported at their upper ends by said baffles and so arranged as to form vertical passages in said casing, a layer of granular material located on the top surface of each of said baffles and closely surrounding said ducts, said granular material preventing hot gases from entering said ducts, and fibrous resilient packing between adjacent ends of the vertically aligned ducts.

6. A recuperator comprising a casing, baffles located in said casing, vertically aligned ducts supported on their upper ends by said baffles and so arranged as to form vertical unobstructed passages in said casing, a layer of granular material located on each of said baffles and closely surrounding said ducts, said granular material preventing hot gases from entering said ducts, an air chamber formed in the upper end of said casing, and air inlet passages formed in the lower part of said casing.

7. A recuperator comprising a casing, horizontally arranged baffles located in said casing, vertically aligned ducts supported adjacent their upper ends by said baffles and so arranged as to form continuous vertical passages in said casing, passages in the casing, an inlet in the upper portion of said casing for admitting hot furnace gases thereto, an outlet formed in the lower portion of said casing for drawing said gases therefrom, and a layer of granular material located on each of said baffles and closely surrounding said ducts, said granular material preventing said hot gases from entering said ducts.

8. A recuperator comprising a casing, parallel horizontally arranged baffles located in said casing, vertically aligned ducts having a bell on one end carried by said baffles at the bell end, said bell adapted to receive the opposite end of a duct in vertical alignment therewith, fibrous resilient packing between adjacent ends of the vertically aligned ducts extending into the bell, a passage for admitting hot gases to said casing, a passage for withdrawing said hot gases from said casing after they have circulated around said ducts, and a layer of granular material located on each of said baffles and closely surrounding said ducts, said granular material preventing furnace gases from entering said ducts.

9. A recuperator comprising a casing, parallel horizontally arranged baffles located in said casing, a plurality of vertically aligned ducts having a bell on one end, said bell loosely carried by said baffles, each of said bells adapted to receive the opposite end of a duct carried by a baffle immediately above and in vertical alignment therewith, and a layer of granular material located on each of said baffles and closely surrounding said ducts, said granular material adapted to move freely as said baffles and ducts expand and contract for preventing gases from entering into or passing from said ducts.

10. A recuperator comprising a casing, a plurality of horizontally extending vertically spaced apart baffles having openings therein located in said casing, a plurality of ducts carried by each of said baffles and passing through said openings, said ducts being vertically aligned and having a bell on one end which is supported by said baffles, said bell adapted to receive the opposite end of a duct in vertical alignment therewith, fibrous resilient packing material between adjacent ends of the vertically aligned ducts, and a layer of granular material located on each of the said baffles and closely surrounding said ducts, said granular material being free to move as the baffles and ducts expand and contract thereby preventing gases from entering or passing from said baffles into said ducts.

In testimony whereof I have affixed my signature.

GEORGE M. PARKER.